United States Patent [19]

Ramun et al.

[11] 4,376,340
[45] Mar. 15, 1983

[54] MATERIAL HANDLING AND SHEARING ATTACHMENT FOR A BACKHOE

[76] Inventors: Michael Ramun; John R. Ramun, both of 2100 Poland Ave., Youngstown, Ohio 44502

[21] Appl. No.: 261,679

[22] Filed: May 7, 1981

[51] Int. Cl.³ .............................................. E02F 3/28
[52] U.S. Cl. ...................................... 30/134; 30/228; 144/34 E; 83/609
[58] Field of Search .................... 83/928, 694, 609; 30/134, 228, 233, 258; 414/740; 144/34 E

[56] References Cited

U.S. PATENT DOCUMENTS

| | | | |
|---|---|---|---|
| Re. 26,992 | 11/1970 | Rehnstrom | 144/34 E |
| 2,613,437 | 10/1952 | McPhee | 30/228 |
| 3,230,988 | 6/1966 | Dixon | 144/34 E |
| 3,802,731 | 4/1974 | LaBounty | 294/104 X |
| 4,044,804 | 8/1977 | Dodd | 83/928 |
| 4,104,792 | 8/1978 | LaBounty | 30/134 |
| 4,188,721 | 2/1980 | Ramun | 30/134 |
| 4,198,747 | 4/1980 | LaBounty | 30/134 |
| 4,217,000 | 8/1980 | Watanabe | 144/34 E |

*Primary Examiner*—Jimmy C. Peters
*Attorney, Agent, or Firm*—Harpman & Harpman

[57] ABSTRACT

A material handling and shear attachment for a backhoe enables the backhoe to be used in grasping and moving structural beams, pipes, cables, and the like, and pivotally positions a cutting blade in the form of a hook on the end of a backhoe boom for actuation by a piston and cylinder of the backhoe. A fixed blade is secured to the boom forming a shear point between the movable cutting blade and the fixed blade.

7 Claims, 4 Drawing Figures

MATERIAL HANDLING AND SHEARING ATTACHMENT FOR A BACKHOE

BACKGROUND OF THE INVENTION (1) Field of the Invention

This invention relates to attachment for backhoes as commonly used in industry and particularly in dismantling industrial buildings.

(2) Description of the Prior Art

Prior devices of this type are best represented by our U.S. Pat. No. 4,188,721 which shows a backhoe attachment for cutting and moving cables or the like. Other prior art is represented by U.S. Pat. No. 4,198,747 which discloses a hydraulic shear for a backhoe in which a pair of fixed blades are arranged in spaced relation and a movable blade is arranged for movement therebetween in a shearing action.

In the present invention there is only a single fixed blade and a single movable blade and the device is workable in cutting large sections of steel beams, pipes, and the like, in a sissors-like action because of the arrangement of a guide positioned in spaced relation to the fixed blade and against which the hook-shaped shearing blade engages and moves prior to an actual shearing operation so that the desired scissors-like shearing action of the device can be maintained and at the same time the work pieces can be held in position while being sheared rather than being expelled as would otherwise occur.

SUMMARY OF THE INVENTION

A material handling and shearing attachment for a backhoe comprises a fixed blade having a movable hook-shaped cutting blade pivoted thereto positioned on the end of a backhoe boom in place of a normal bucket. A pair of pivotal arms are secured to the cutting blade and to a hydraulic piston and cylinder on the backhoe. A blade guide is positioned in spaced parallel relation to the fixed blade and forms means for confining the movable blade to a path alongside the fixed blade where it will operate to cut material in a scissors-like shearing action when it is moved by the hydraulic piston and cylinder.

DESCRIPTION OF THE PREFERRED EMBODIMENT

Backhoes such as used in industry are powered machines having an extensible boom with hydraulic controlled cylinders mounted thereon. A bucket is normally attached to the end of the boom and is moved by one or more hydraulic piston and cylinder assemblies. Applicant's device is an attachment for a backhoe that is used in place of the bucket for handling and shearing and moving structural beams, pipes, cables and other structural members and the like normally found in structures being dismantled.

Figure 1:
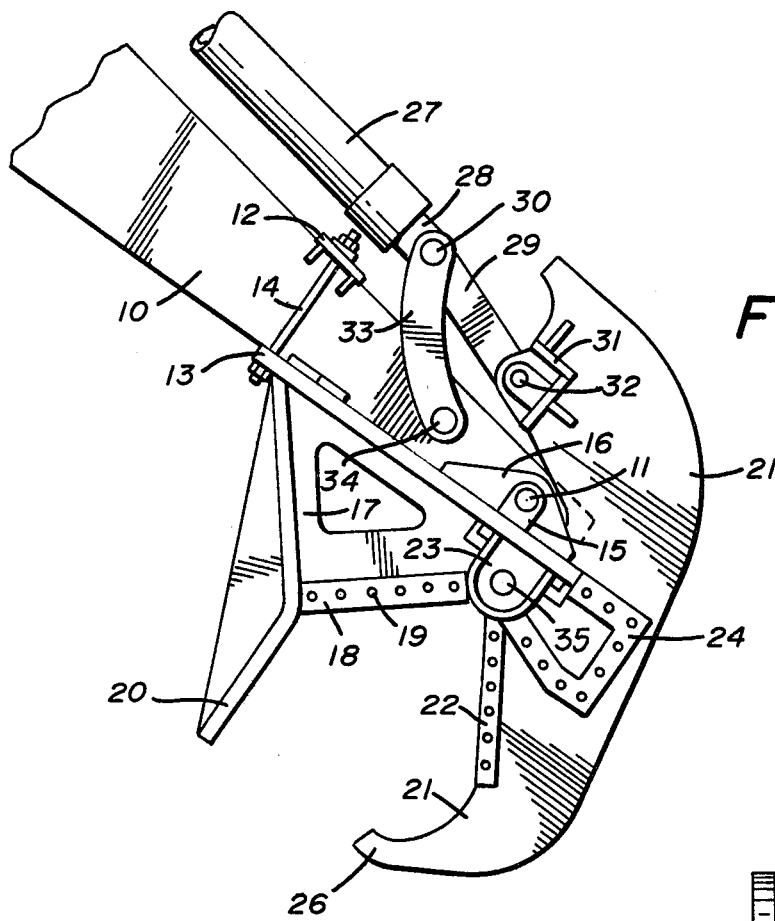
FIG. 1 is a side elevation of the material handling and shear attachment with the hook-shaped blade in open position.
Figure 2:
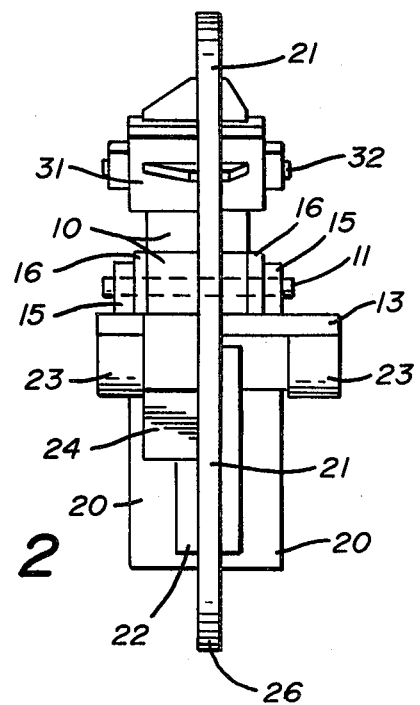
FIG. 2 is an end elevation thereof.
Figure 3:
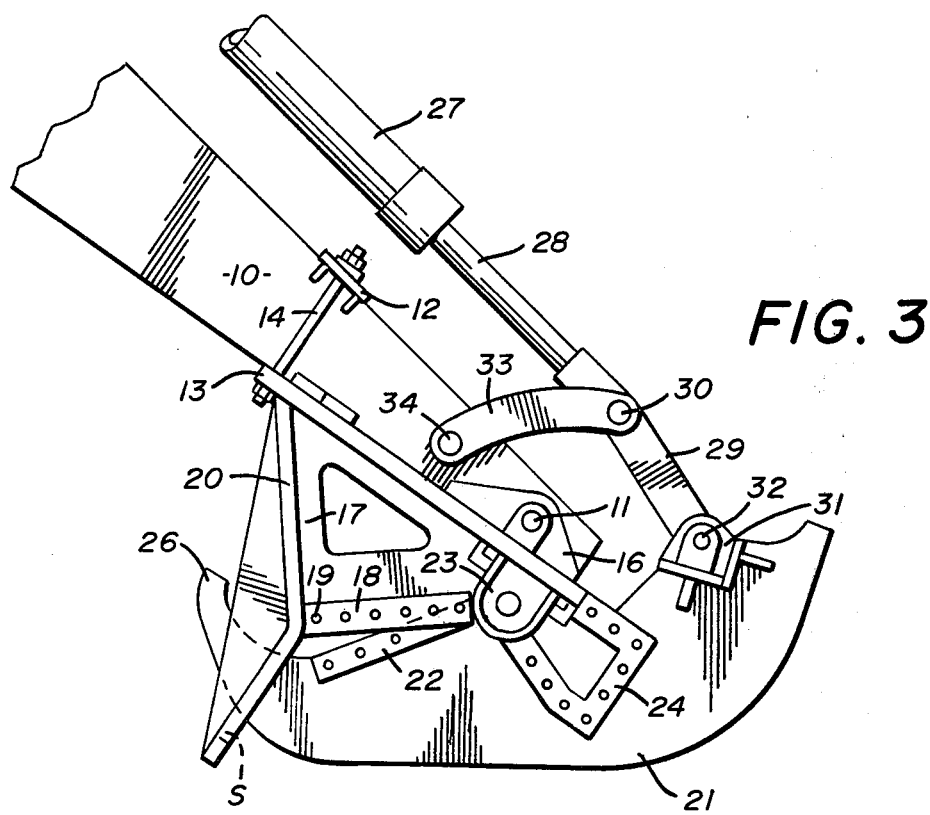
FIG. 3 is a side elevation of the material handling and shear attachment with the hook-shaped blade in closed position and FIG. 4 is a back perspective view of the material handling and shear attachment with the blade in partially closed position.
Figure 4:
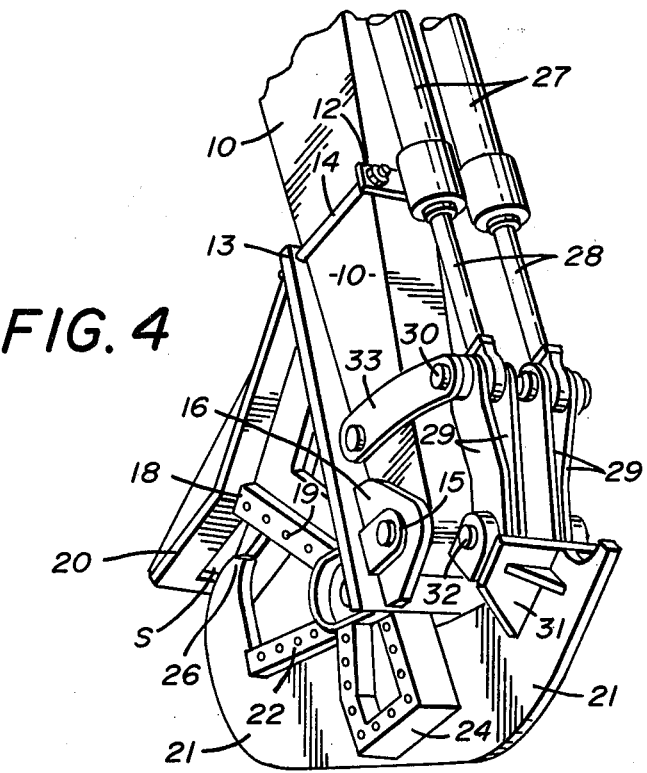

As will be seen in the drawings, a backhoe boom 10 has a transverse pivot 11 positioned therethrough near its outer end and an apertured plate 12 thereon inwardly of the outer end. A mounting body 13 is secured to the boom 10 on the lower surface thereof as illustrated in FIGS. 1 and 3 of the drawings by fasteners 14 positioned therethrough and through the apertured plate 12 and by spaced apertured lugs 15 on the mounting body 13 engaged on the pivot pin 11. Gussets 16 on the mounting body 13 are also engaged on the pivot pin 11 which can take the form of a suitable bolt and nut assembly.

The opposite or lower side of the mounting body 13 carries a triangular blade supporting body member 17 to which a hardened steel blade 18 is attached by several fasteners 19 and a pair of spaced parallel angular guides 20 are attached to the triangular blade supporting body 17 at substantially right angles to the blade 18 so as to form an elongated slot S into which a portion of a hook-shaped cutting blade 21 may move in a scissors-like shearing action relative to the fixed blade 18. The hook-shaped cutting blade 21 is pivotally mounted on the mounting body 13 by a pivot pin 35 engaged in spaced brackets 23 which are in turn attached to the lower side of the mounting body 13.

A support frame 24 forms the actual point of pivotal engagement with the pin 35 the support frame 24 being positioned on the side of the hook-shaped cutting blade 21 opposite the fixed cutting blade 18 where it adds rigidity to the hook-shaped cutting blade 21. The configuration of the hook shaped cutting blade 21 is important to the operation of the device as the portion of the blade 21 beyond the hardened cutting edge portion 22 curves outwardly and upwardly with respect to the cutting blade portion 22 to form a relatively large hook shape which will engage and substantially register with the slot S between the spaced parallel angularly disposed guides 20 considerably before the straight cutting edge portion 22 of the blade comes into shearing action with respect to an article therein to be sheared.

In FIG. 1 of the drawings the hook-shaped cutting blade is shown in open position and it will be observed that due to the hook-shaped end 26 thereof the attachment may be used to grasp and hold and pull and/or lift beams, pipes, cables, or the like, to be moved and sheared and that upon the closing of the hook-shaped cutting blade 21 as seen in FIG. 3 of the drawings, the material will be held against movement from the blade area during the shearing action as the blades 18 and 22 close in a shearing action.

In order that the hook-shaped cutting blade 21 can be moved in a material grasping, holding or pulling or shearing action, one or more piston and cylinder assemblies are used and these may comprise the piston and cylinder assemblies normally found on a back hoe boom and normally used to operate the bucket thereon. In the present disclosure the arrangement illustrated includes two hydraulic cylinders 27 with piston rods 28 thereof engaged on links 29 by pivots 30 with the links 29 being pivotally attached to brackets 31 on the opposite sides of the hook-shaped cutting blade 21 by a blade pivot pin 32. Secondary links 33 are also engaged on the pivot pins 30 and on boom pivot pins 34 so that the movable end of the cylinders 27 will remain in spaced relation to the boom 10 of the backhoe when the material handling and shearing attachment disclosed in the present invention is used.

The device of the present disclosure is similar to that of our U.S. Pat. No. 4,188,721 and comprises an improvement with respect thereto particularly with respect to the mounting arrangement and configuration of the hook-shaped cutting blade 21 and the provision of the spaced parallel angular guides 20, which being attached to one another at their opposite ends, define an elongated slot S as hereinbefore described in which the hook end 26 of the hook-shaped cutting blade 21 initially registers and is substantially engaged when the actual shearing action of a work piece by the device takes place.

The construction is such that the device can and does handle beams, pipes, cables and other structural members that were incapable of being handled by the device of our U.S. Pat. No. 4,188,721, primarily because in the present disclosure the material is completely caged by or encircled by the hook portion of the hook-shaped cutting blade 21 and the spaced parallel angular guides 20 before shearing engagement of the blades is reached and at the same time the desirable and efficient scissors-like shearing action of a pair of pivoted blades is maintained, which has proven to be highly satisfactory in actual operation in the field.

Although but one embodiment of the present invention has been illustrated and described, it will be apparent to those skilled in the art that various changes and modifications may be made therein without departing from the spirit of the invention and having thus described our invention what we claim is:

1. An improvement in a cutting and manipulating attachment for a backhoe, the bucket of which has been removed, and having a boom with a controlled piston and cylinder connected thereto, the improvement comprising: means for keeping a cutting portion of a movable cutting blade in shearing relation to a fixed cutting blade throughout the entire extent of the shearing movement of the blades with respect to each other; said movable blade having an elongated substantially hook-shaped end portion hooked generally toward said fixed blade; said cutting and manipulating attachment comprising: a mounting body and means for attaching the same to the boom of the backhoe; means positioning said fixed cutting blade on said mounting body and means located at a first end of said fixed cutting blade pivotally mounting said movable cutting blade on said mounting body in pivotal relation to said fixed cutting blade; said means for keeping the cutting position of said movable cutting blade in shearing relation to said fixed cutting blade comprising a pair of spaced parallel guides located adjacent and fixed to a second end of said fixed cutting blade and extending from said fixed cutting blade second end at an obtuse angle with respect to said fixed cutting blade and defining an elongated guide path, said guide path being positioned and sized to receive said hook-shaped end portion of said movable hook-shaped cutting blade before said cutting portion of said movable blade comes into shearing action with respect to a workpiece disposed between said blades, so that said hook-shaped end portion and said pair of guides hold the workpiece for cutting as said movable cutting blade cutting portion moves in shearing relation with said fixed blade; and links operatively connecting said movable cutting blade to said piston and cylinder assembly so that the same can be moved relative to said fixed blade thereby.

2. The improvement in a cutting and manipulating attachment for a backhoe of claim 1 wherein said portions of said parallel guides are coplanar with said fixed cutting blade and have angular extensions downwardly and outwardly thereof.

3. The improvement in a cutting and manipulating attachment for a backhoe of claim 1 wherein said parallel guides are of a length which is substantially the same as the known length of said movable hook-shaped end portion.

4. The improvement in a cutting and manipulating attachment for a backhoe of claim 1 wherein a reinforcing body is mounted on the side of said movable cutting blade opposite to its shearing engagement with said fixed blade.

5. The improvement in a cutting and manipulating attachment for a backhoe of claim 1 wherein hardened cutting bars are attached to the respective engaging edges of said fixed and movable cutting blades for shearing engagement with one another.

6. The improvement in a cutting and manipulating attachment for a backhoe of claim 1 wherein said movable cutting blade extends at essentially a right angle with respect to a longitudinal axis of the boom.

7. The improvement in a cutting and manipulating attachment for a backhoe of claim 5 wherein a hardened cutting bar extends from adjacent said means for pivotally mounting said movable cutting blade, to said substantially hook-shaped end portion of said movable cutting blade, terminating at said substantially hook-shaped end portion.

* * * * *